(12) United States Patent
Newman et al.

(10) Patent No.: US 10,393,181 B2
(45) Date of Patent: Aug. 27, 2019

(54) INDUSTRIAL MOWER SEALED ROLLER BEARING SYSTEM

(71) Applicant: Diamond Mowers, LLC, Sioux Falls, SD (US)

(72) Inventors: Shannon Newman, Sioux Falls, SD (US); Matt Nelson, Sioux Falls, SD (US)

(73) Assignee: Diamond Mowers, LLC, Sioux Falls, SD (US)

( * ) Notice: Subject to any disclaimer, the term of this patent is extended or adjusted under 35 U.S.C. 154(b) by 0 days.

(21) Appl. No.: 15/949,687

(22) Filed: Apr. 10, 2018

(65) Prior Publication Data

US 2018/0291961 A1 Oct. 11, 2018

Related U.S. Application Data

(60) Provisional application No. 62/484,363, filed on Apr. 11, 2017.

(51) Int. Cl.
*F16C 19/38* (2006.01)
*F16C 19/54* (2006.01)
(Continued)

(52) U.S. Cl.
CPC .......... *F16C 33/782* (2013.01); *A01D 34/00* (2013.01); *A01D 34/62* (2013.01); *A01D 34/82* (2013.01); *B65G 39/02* (2013.01); *F16C 13/022* (2013.01); *F16C 19/38* (2013.01); *F16C 19/548* (2013.01); *F16C 33/723* (2013.01);
(Continued)

(58) Field of Classification Search
CPC ...... F16C 10/38; F16C 19/548; F16C 33/723; F16C 33/782; F16C 33/7886; F16C 35/00; F16C 13/024; F16C 2310/00; F16C 19/38; F16C 13/022; A01D 34/00; A01D 34/62; A01D 34/82; A01D 2101/00; B65G 39/02; B65G 39/10; F16F 13/02; F16J 1/20; F16J 15/16
USPC ....... 384/477, 504, 546, 579, 583, 586, 567, 384/571; 474/199; 56/17.2, 17.5, 221, 56/249, 249.5, 292
See application file for complete search history.

(56) References Cited

U.S. PATENT DOCUMENTS 2,197,264 A 4/1940 Cooper
2,378,488 A 6/1945 Loewe
(Continued)

FOREIGN PATENT DOCUMENTS

CN 205423567 U * 8/2016 .............. F16C 35/00

*Primary Examiner* — Marcus Charles
(74) *Attorney, Agent, or Firm* — Ballard Spahr LLP

(57) ABSTRACT

An industrial mower sealed roller bearing system provides a roller bearing to avoid repeated and frequent repacking. The system includes an industrial mower having a roller mount and a ground roller. The ground roller bearing includes an insert body having a first end, a closed second end, and a channel extending into the first end towards the second end. An outer section of a shaft extends from the insert body and is couplable to the roller mount. A face seal is provided at the first end of the insert body to define a sealed interior chamber. The face seal is positioned relative to the insert body and the shaft such that the insert body is rotatable relative to the shaft. Each of a plurality of interior bearings is positioned within the sealed interior chamber of the insert body such that the insert body is rotatable relative to the shaft.

9 Claims, 4 Drawing Sheets

(51) Int. Cl.
*F16C 33/78* (2006.01)
*A01D 34/00* (2006.01)
*F16C 35/00* (2006.01)
*F16J 15/16* (2006.01)
*B65G 39/02* (2006.01)
*F16C 13/02* (2006.01)
*A01D 34/62* (2006.01)
*A01D 34/82* (2006.01)
*F16C 33/72* (2006.01)
*A01D 101/00* (2006.01)

(52) U.S. Cl.
CPC .......... *F16C 33/7886* (2013.01); *F16C 35/00* (2013.01); *F16J 15/16* (2013.01); *A01D 2101/00* (2013.01); *F16C 2310/00* (2013.01)

(56) References Cited

U.S. PATENT DOCUMENTS

| | | | | |
|---|---|---|---|---|
| 2,458,200 A | | 1/1949 | Renfroe | |
| 2,782,586 A | | 2/1957 | Specht | |
| 3,313,168 A | * | 4/1967 | Matthews | B65G 39/02 198/842 |
| 3,416,638 A | * | 12/1968 | Buck | B65G 39/04 193/35 R |
| 3,555,793 A | * | 1/1971 | Chapman | A01D 34/828 56/17.4 |
| 3,793,689 A | * | 2/1974 | Specth | B65G 39/02 193/37 |
| 3,977,078 A | | 8/1976 | Pittinger, Jr. | |
| 4,638,622 A | * | 1/1987 | Smith | A01D 34/82 56/17.4 |
| 4,673,380 A | * | 6/1987 | Wagner | B65G 39/02 361/212 |
| 5,022,132 A | * | 6/1991 | Valster | B65G 39/09 193/37 |
| 5,261,213 A | * | 11/1993 | Humphrey | A01D 34/62 404/117 |
| 5,261,528 A | * | 11/1993 | Bouchal | B65G 39/09 193/37 |
| 5,394,681 A | | 3/1995 | Nolan | |
| 5,483,789 A | | 1/1996 | Gummerson | |
| 5,809,765 A | | 9/1998 | Hastings | |
| 6,467,245 B1 | * | 10/2002 | Humphrey | A01D 34/62 172/118 |
| 6,732,500 B1 | * | 5/2004 | Myers | A01D 34/54 56/17.2 |
| 6,755,299 B2 | * | 6/2004 | Itoh | B65G 39/09 193/37 |
| 7,600,365 B2 | * | 10/2009 | Hibi | A01D 43/063 56/199 |
| 7,661,257 B2 | * | 2/2010 | Slater | A01B 29/06 56/249.5 |
| 7,806,252 B2 | * | 10/2010 | Kanaris | B65G 23/08 198/788 |
| 8,146,733 B2 | * | 4/2012 | Fox | B65G 39/09 193/37 |
| 8,316,628 B2 | * | 11/2012 | Humphrey | A01B 45/026 56/249 |
| 8,356,465 B2 | * | 1/2013 | Hallale | A01D 34/54 56/17.2 |
| 8,790,018 B2 | * | 7/2014 | Leuver | B65G 39/09 384/477 |
| 9,635,809 B2 | * | 5/2017 | Iyasere | A01D 34/006 |
| 2004/0108189 A1 | * | 6/2004 | Itoh | B65G 13/06 198/780 |

\* cited by examiner

US 10,393,181 B2

INDUSTRIAL MOWER SEALED ROLLER BEARING SYSTEM

CROSS-REFERENCE TO RELATED APPLICATIONS

We hereby claim the benefit under 35 U.S.C. Section 119(e) of U.S. Provisional application 62/484,363 filed Apr. 11, 2017.

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM.

Not Applicable

STATEMENT REGARDING PRIOR DISCLOSURES BY THE INVENTOR OR JOINT INVENTOR

Not Applicable

BACKGROUND OF THE INVENTION (1) Field of the Invention
(2) Description of Related Art including Information Disclosed under 37 CFR 1.97 and 1.98

The disclosure and prior art relates to bearing devices and more particularly pertains to a new bearing device for providing a roller bearing for industrial mowers which does not require repeated and frequent repacking for maintenance.

BRIEF SUMMARY OF THE INVENTION

An embodiment of the disclosure meets the needs presented above by generally comprising an industrial mower having a roller mount and a ground roller removably positionable to extend from the roller mount such that the ground roller is rotatable relative to the roller mount. The ground roller bearing includes an insert body having a first end, a closed second end, and a channel extending into the first end towards the second end. An outer section of a shaft extends from the insert body and is couplable to the roller mount. A face seal is provided at the first end of the insert body to define a sealed interior chamber. The face seal is positioned relative to the insert body and the shaft such that the insert body is rotatable relative to the shaft. Each of a plurality of interior bearings is positioned within the sealed interior chamber of the insert body such that the insert body is rotatable relative to the shaft.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
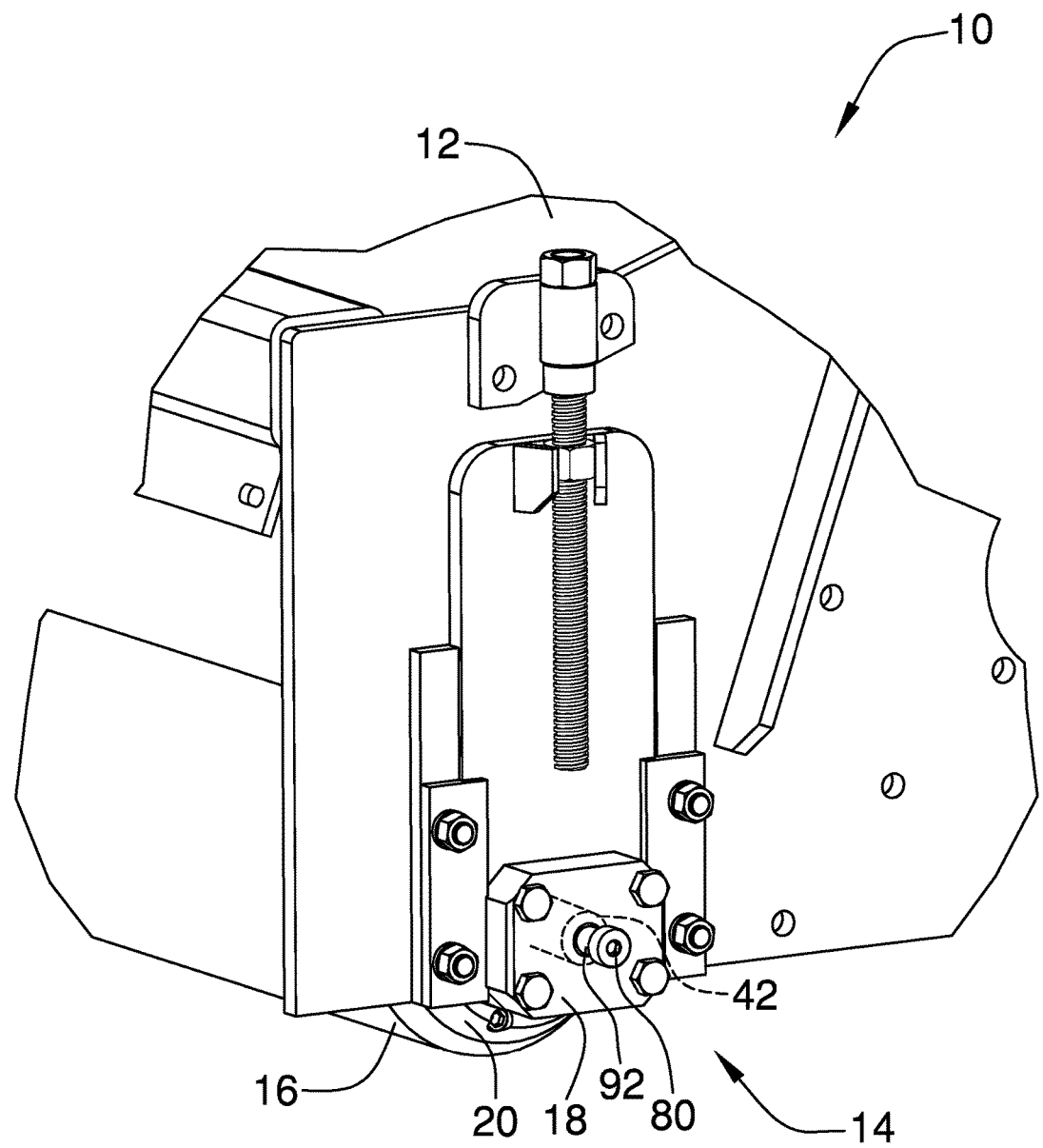
FIG. 1 is a detailed top front perspective view of an industrial mower sealed roller bearing system according to an embodiment of the disclosure.
Figure 2:
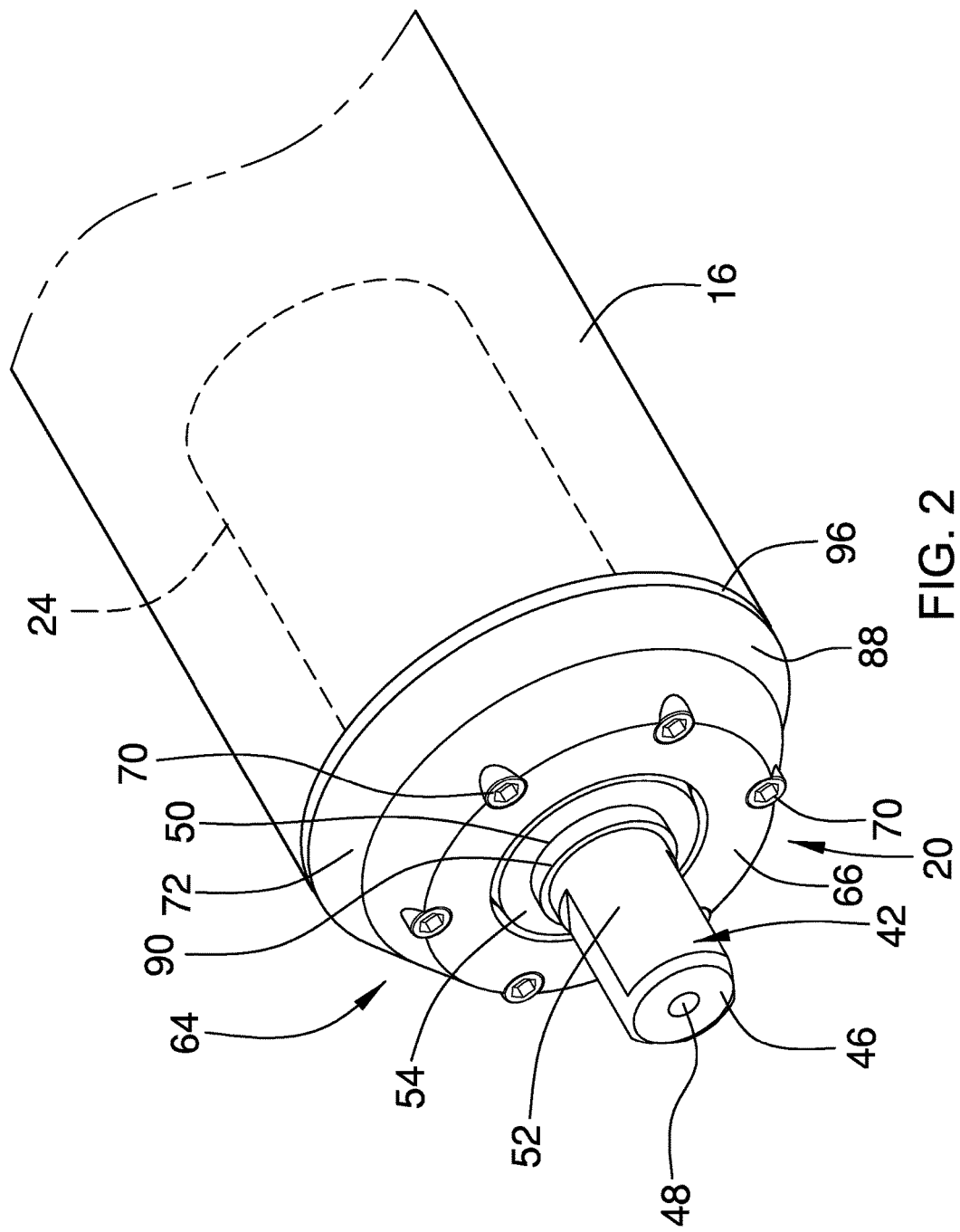
FIG. 2 is a top front perspective view of a ground roller insert in a ground roller of an embodiment of the disclosure.
Figure 3:
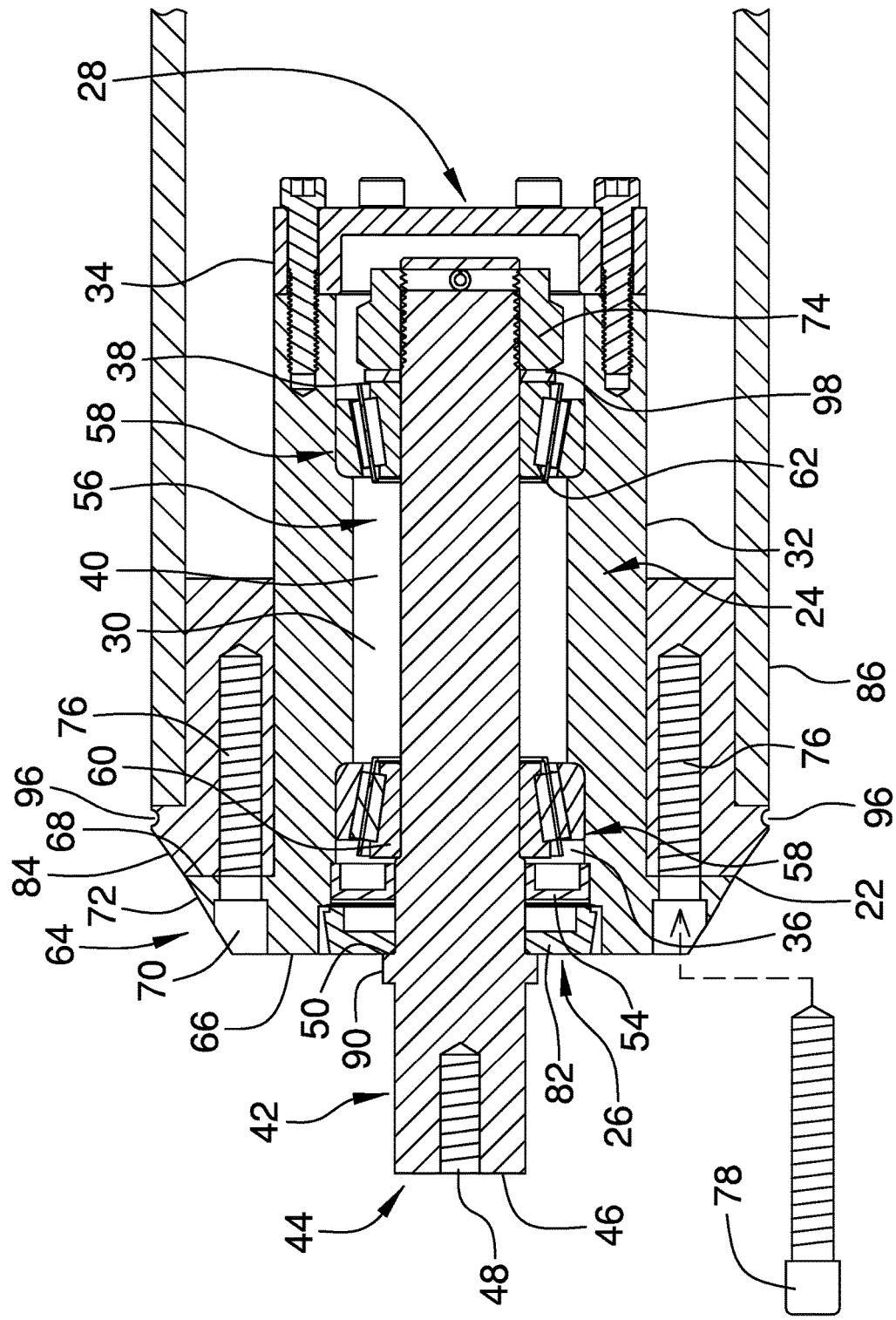
FIG. 3 is a cross-sectional view of an embodiment of the disclosure taken along line 3-3 of FIG. 2.

With reference now to the drawings, and in particular to FIGS. 1 through 4 thereof, a new bearing device embodying the principles and concepts of an embodiment of the disclosure and generally designated by the reference numeral 10 will be described.

As best illustrated in FIGS. 1 through 4, the industrial mower sealed roller bearing system 10 generally comprises an industrial mower 12 of conventional construction. The industrial mower 12 has a roller mount 14 and a ground roller 16 removably positionable to extend from the roller mount 14. The roller mount 14 may be conventionally adjustable for positioning of the ground roller 16 in a desired position relative to the industrial mower 12. The roller mount 14 includes a receiver 18. The receiver 18 includes an aperture 92 extending through the receiver 18.

Figure 4:
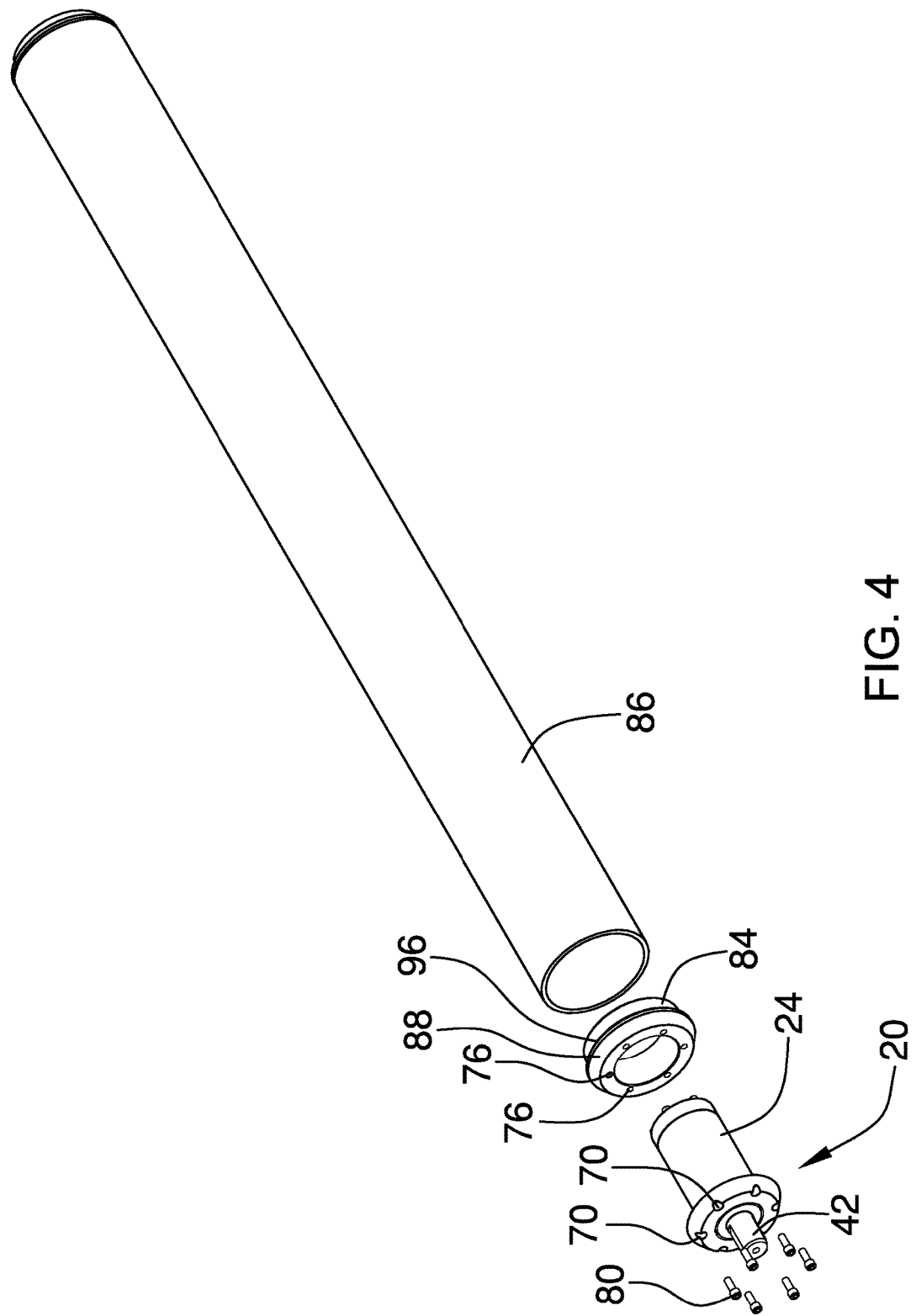
FIG. 4 is an exploded perspective view of a ground roller insert and ground roller of an embodiment of the disclosure.

A ground roller bearing 20 is removably coupled to an end 22 of the ground roller 16. The ground roller bearing 20 is couplable to the roller mount 14 wherein the ground roller 16 is rotatable relative to the roller mount 14. The ground roller bearing 20 includes an insert body 24. The insert body 24 is couplable to the ground roller 16. As shown in FIG. 4, an end collar 84 may be attached to a ground roller tube 86 to define the ground roller 16. The end collar 84 may be welded to the ground roller tube 86. The end collar 84 may include a beveled edge 88 to taper extending away from the ground roller tube 86. A weld line 96 is provided adjacent to the beveled edge 88 for welding the end collar 84 to the ground roller tube 86. After welding, grinding of the weld provides for a smooth transition from the ground roller tube 86 to the beveled edge 88 of the end collar 84.

The insert body 24 has a first end 26 and a second end 28. The insert body 24 has a channel 30 extending into the first end 26 towards the second end 28. The second end 28 of the insert body 24 is closed. The insert body 24 has a main section 32 and an end section 34. The end section 34 is coupled to the main section 32 to define the second end 28 of the insert body 24. The channel 30 has a first end portion 36, a second end portion 38, and a medial portion 40 extending between the first end portion 36 and the second end portion 38. The medial portion 40 has a circumference less than respective circumferences of each of the first end portion 36 and the second end portion 38.

A shaft 42 extends into the insert body 24 through the first end 26. An outer section 44 of the shaft 42 extends from the insert body 24 for coupling to the roller mount 14. A distal end surface 46 of the shaft 42 relative to the insert body 24 has a threaded bore 48 extending therein. The distal end surface 46 of the shaft 42 is positionable within the receiver 18 such that the threaded bore 48 aligns with the aperture 92 through the receiver 18. The shaft 42 has a circumferential lip 50 to bear against a shaft collar 82 positioned at the first end 26 of the insert body 24. The circumferential lip 50 may be an end of the outer section 44 facing the insert body 24 or may be a surface of a ring 90 extending outwardly from an outer surface 52 of the outer section 44 of the shaft 42. A face seal 54 is positioned in the insert body 24 engaging the shaft 42 proximate to the first end 26 of the insert body 24 defining a sealed interior chamber 56 of the insert body 24. The face seal 54 is coupled to the insert body 24 and the shaft 42 such that the insert body 24 is rotatable relative to the shaft 42. Each of a plurality of interior bearings 58 is positioned within the sealed interior chamber 56 of the insert body 24 wherein the insert body 24 is rotatable relative to the shaft 42. The plurality of interior bearings 58 includes more specifically a first bearing 60 positioned within the first end portion 36 of the channel 30 and a second bearing 62 positioned within the second end portion 38 of the channel 30.

A flange 64 extends laterally outward from the insert body 24. The flange 64 has a first surface 66 coplanar with the first end 26 of the insert body 24. The flange 64 has a second surface 68 positioned to abut the ground roller 16 when the insert body 24 is inserted into the ground roller 16. The flange 64 has a plurality of connection holes 70 extending between the first surface 66 of the flange 64 and the second surface 68 of the flange 64. The flange 64 has a peripheral surface 72 extending between the first surface 66 and the second surface 68. The peripheral surface 72 is angled such that the flange 64 tapers extending from the second surface 68 to the first surface 66. A nut 74 is coupled to the shaft 42. The nut 74 bears against a thrust washer 98 which in turn bears against the second bearing 62 wherein tightening of the nut 74 urges the shaft 42 inwardly into the channel 30 and the circumferential lip 50 against the shaft collar 82.

Each of a plurality of threaded openings 76 extends into the end collar 84 of the ground roller 16. Each of the threaded openings 76 is alignable with an associated one of the connection holes 70 when the insert body 24 is inserted into the ground roller 16. Each of a plurality of connectors 78 is extended through an associated one of the connection holes 70 to engage the threaded opening 76 wherein the insert body 24 is coupled to the ground roller 16. A fastener 80 extends through the aperture 92 and into the threaded bore 48 wherein the fastener 80 threadedly engages the shaft 42 to the roller mount 14.

In use, the ground roller bearing 20 provides a sealed bearing which does not have to be repacked on a frequent basis. The interior construction of the ground roller bearing 20 allows for rotation of the shaft 42 relative to the insert body 24. The insert body 24 is coupled to the ground roller 16 in a fixed manner as described above. The shaft 42 is coupled to the roller mount 14 such that the shaft is fixed relative to the roller mount 14 as described above. The free rotation of the shaft 42 relative to the ground roller 16 allows the ground roller 16 to rotate freely relative to the roller mount 14.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

We claim:

1. An industrial mower sealed roller bearing system comprising: an industrial mower having a roller mount and a ground roller removably positionable to extend from said roller mount;
   a ground roller bearing removably coupled to an end of said ground roller, said ground roller bearing being couplable to said roller mount wherein said ground roller is rotatable relative to said roller mount, said ground roller bearing comprising
   an insert body, said insert body being couplable to said ground roller, said insert body having a first end and a second end said insert body having a channel extending into said first end towards said second end, said second end of said insert body being closed,
   a shaft extending into said insert body through said first end, an outer section of said shaft extending from said insert body being couplable to said roller mount,
   a face seal positioned in said insert body and engaging said shaft proximate said first end of said insert body defining a sealed interior chamber of said insert body, said face seal being coupled to said insert body and said shaft such that said insert body is rotatable relative to said shaft, and
   a plurality of interior bearings being positioned within said sealed interior chamber of said insert body wherein said insert body is rotatable relative to said shaft.

2. The system of claim 1, further comprising:
   a distal end surface of said shaft relative to said insert body having a threaded bore extending therein; and said roller mount including a receiver, said receiver including an aperture extending through said receiver, said distal end surface of said shaft being positionable within said receiver such that said threaded bore aligns with said aperture through said receiver; and
   a fastener, said fastener extending through said aperture and into said threaded bore wherein said fastener threadedly engages said shaft to said roller mount.

3. The system of claim 1, further comprising said insert body having a main section and an end section, said end section being coupled to said main section to define said second end of said insert body.

4. The system of claim 1, further comprising a flange extending laterally outward from said insert body, said flange having a first surface coplanar with said first end of said insert body, said flange having a second surface positioned to abut said ground roller when said insert body is inserted into said ground roller.

5. The system of claim 4, further comprising:
said flange having plurality of connection holes extending between said first surface of said flange and said second surface of said flange;
a plurality of threaded openings extending into said ground roller, each of said threaded openings being alignable with an associated one of said connection holes when said insert body is inserted into said ground roller; and
a plurality of connectors, each of said connectors being extended through an associated one of said connection holes and engaged to said threaded opening wherein said insert body is coupled to said ground roller.

6. The system of claim 4, further comprising said flange having a peripheral surface extending between said first surface and said second surface, said peripheral surface being angled such that said flange tapers extending from said second surface to said first surface.

7. The system of claim 1, further comprising:
said channel having an first end portion, a second end portion, and a medial portion extending between said first end portion and said second end portion, said medial portion having a circumference less than respective circumferences of each of said first end portion and said second end portion; and
said plurality of bearings including a first bearing positioned within said first end portion of said channel and a second bearing positioned within said second end portion of said channel.

8. The system of claim 7, further comprising:
said shaft having a circumferential lip; and
a nut coupled to said shaft, said nut bearing against said second bearing wherein tightening of said nut urges said shaft inwardly into said channel and said circumferential lip against a shaft collar positioned at said first end of said insert body.

9. An industrial mower sealed roller bearing system comprising:
an industrial mower having a roller mount and a ground roller removably positionable to extend from said roller mount, said roller mount including a receiver, said receiver including an aperture extending through said receiver;
a ground roller bearing removably coupled to an end of said ground roller, said ground roller bearing being couplable to said roller mount wherein said ground roller is rotatable relative to said roller mount, said ground roller bearing comprising an insert body, said insert body being couplable to said ground roller, said insert body having a first end and a second end, said insert body having a channel extending into said first end towards said second end, said second end of said insert body being closed, said insert body having a main section and an end section, said end section being coupled to said main section to define said second end of said insert body, said channel having an first end portion, a second end portion, and a medial portion extending between said first end portion and said second end portion, said medial portion having a circumference less than respective circumferences of each of said first end portion and said second end portion,
a shaft extending into said insert body through said first end, an outer section of said shaft extending from said insert body being couplable to said roller mount, a distal end surface of said shaft relative to said insert body having a threaded bore extending therein, said distal end surface of said shaft being positionable within said receiver such that said threaded bore aligns with said aperture through said receiver, said shaft having a circumferential lip,
a face seal positioned in said insert body and engaging said shaft proximate to said first end of said insert body defining a sealed interior chamber of said insert body, said face seal being coupled to said insert body and said shaft such that said insert body is rotatable relative to said shaft,
a plurality of interior bearings being positioned within said sealed interior chamber of said insert body wherein said insert body is rotatable relative to said shaft, said plurality of interior bearings including a first bearing positioned within said first end portion of said channel and a second bearing positioned within said second end portion of said channel,
a flange extending laterally outward from said insert body, said flange having a first surface coplanar with said first end of said insert body, said flange having a second surface positioned to abut said ground roller when said insert body is inserted into said ground roller, said flange having plurality of connection holes extending between said first surface of said flange and said second surface of said flange, said flange having a peripheral surface extending between said first surface and said second surface, said peripheral surface being angled such that said flange tapers extending from said second surface to said first surface, and
a nut coupled to said shaft, said nut bearing against said second bearing wherein tightening of said nut urges said shaft inwardly into said channel and said circumferential lip against said face seal;
a plurality of threaded openings extending into said ground roller, each of said threaded openings being alignable with an associated one of said connection holes when said insert body is inserted into said ground roller;
a plurality of connectors, each of said connectors being extended through an associated one of said connection holes and engaged to said threaded opening wherein said insert body is coupled to said ground roller; and
a fastener, said fastener extending through said aperture and into said threaded bore wherein said fastener threadedly engages said shaft to said roller mount.

* * * * *